(12) United States Patent
De Smet et al.

(10) Patent No.: US 10,240,502 B2
(45) Date of Patent: Mar. 26, 2019

(54) METHOD OF MONITORING AN EXHAUST GAS AFTERTREATMENT SYSTEM

(71) Applicant: Ford Global Technologies, LLC, Dearborn, MI (US)

(72) Inventors: Frederik De Smet, Genk (BE); Kim Ford, Basildon (GB); Marcus Timothy Davies, Rochester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 15/407,138

(22) Filed: Jan. 16, 2017

(65) Prior Publication Data

US 2017/0211444 A1    Jul. 27, 2017

(30) Foreign Application Priority Data

Jan. 22, 2016    (DE) .................. 10 2016 200 941

(51) Int. Cl.
| | |
|---|---|
| *F01N 3/00* | (2006.01) |
| *F01N 3/20* | (2006.01) |
| *F01N 9/00* | (2006.01) |
| *F01N 11/00* | (2006.01) |
| *F01N 3/08* | (2006.01) |

(52) U.S. Cl.
CPC ............ *F01N 3/20* (2013.01); *F01N 3/0842* (2013.01); *F01N 9/00* (2013.01); *F01N 11/007* (2013.01); *F01N 2550/03* (2013.01); *F01N 2550/20* (2013.01); *F01N 2560/025* (2013.01); *F01N 2560/026* (2013.01); *F01N 2560/14* (2013.01); *F01N 2570/14* (2013.01); *F01N 2900/0418* (2013.01); *F01N 2900/14* (2013.01); *F01N 2900/1602* (2013.01); *F01N 2900/1612* (2013.01); *Y02T 10/47* (2013.01)

(58) Field of Classification Search
CPC ............ F01N 2550/03; F01N 2550/20; F01N 11/007; F01N 2560/025; F01N 2560/026; F01N 2560/14; F01N 2570/14; F01N 2900/0418; F01N 2900/14; F01N 2900/1602; F01N 2900/1612; F01N 3/0842; F01N 3/20; F01N 9/00; Y02T 10/47
USPC ........................ 60/277, 285, 295, 297, 301
See application file for complete search history.

(56) References Cited

U.S. PATENT DOCUMENTS

| | | | |
|---|---|---|---|
| 2002/0012623 A1* | 1/2002 | Gobel | F01N 3/0807 423/239.1 |
| 2008/0216466 A1* | 9/2008 | Morita | F01N 3/0885 60/284 |
| 2009/0044516 A1* | 2/2009 | Gabe | B01D 53/9431 60/281 |

FOREIGN PATENT DOCUMENTS

| | | |
|---|---|---|
| DE | 19963927 A1 | 7/2001 |
| DE | 10008563 A1 | 5/2002 |
| DE | 10302700 A1 | 7/2004 |
| DE | 10318214 * | 11/2004 |

(Continued)

*Primary Examiner* — Phutthiwat Wongwian
*Assistant Examiner* — Diem Tran
(74) *Attorney, Agent, or Firm* — Julia Voutyras; McCoy Russell LLP

(57) ABSTRACT

The subject matter of the disclosure relates to a method of diagnosing NOx storage catalyst during the operation of a motor vehicle. The method uses two diagnosis sub-methods having various sensitivities with respect to sulfur contamination of the NOx storage catalyst. The results of the two sub-methods are used to ascertain proportions of aging of the NOx storage catalyst resulting from thermal aging and sulfur contamination.

18 Claims, 6 Drawing Sheets

(56) References Cited

FOREIGN PATENT DOCUMENTS

| | | |
|---|---|---|
| DE | 10318214 A1 | 11/2004 |
| DE | 102012218728 A1 | 7/2013 |
| EP | 1190164 B1 | 11/2006 |
| JP | 2004060518 A | 2/2004 |
| JP | 2008255965 A | 10/2008 |

\* cited by examiner

METHOD OF MONITORING AN EXHAUST GAS AFTERTREATMENT SYSTEM

CROSS REFERENCE TO RELATED APPLICATION

The present application claims priority to German Patent Application No. 102016200941.9, filed on Jan. 22, 2016. The entire contents of the above-referenced application are hereby incorporated by reference in its entirety for all purposes.

FIELD

The invention relates to a method of monitoring an exhaust gas aftertreatment system, especially a NOx storage catalyst, during the operation of a motor vehicle.

BACKGROUND/SUMMARY

In operation, internal combustion engines generate frequently considerable amounts of nitrogen oxides ($NO_x$). Especially in the case of diesel and gasoline engines used in motor vehicles, the amounts of nitrogen oxide in the untreated exhaust gas generally exceed the permissible limits, and so exhaust gas aftertreatment is needed to reduce the $NO_x$ emissions. In many engines, nitrogen oxides are reduced by the nonoxidized and/or partially oxidized constituents present in the exhaust gas, namely by carbon monoxide (CO) and uncombusted hydrocarbons (HC), with the aid of a three-way catalytic converter. Especially in the case of lean burn diesel and gasoline engines, however, this method is unavailable since the high oxygen content in the exhaust gas means that there is no or barely any reduction of $NO_x$. Particularly in the case of lean burn gasoline engines, but also in the case of diesel engines, therefore, in a widespread method, a NOx storage catalyst (also "LNT" from "lean NOx trap") is used, which adsorbs the nitrogen oxides present in the exhaust gas of the internal combustion engine. Once the absorption capacity of the NOx storage catalyst is exhausted, it is typically regenerated by "rich" operation (operation with excess fuel) of the internal combustion engine.

According to the region of production, mineral oil contains various proportions of sulfur. In the commercial fuels produced from mineral oil, there are accordingly residual contents of sulfur. The permissible sulfur contents for filling station fuel have been lowered significantly over the years within the scope of legal measures at least in Europe and North America. Nevertheless, the internal combustion engine, especially diesel engines, is still supplied with residual amounts of sulfur with the fuel. After combustion, this sulfur is present in the exhaust gas.

The ability of the NOx storage catalyst to function decreases with increasing operating time, which is attributable partly to contamination of the NOx storage catalyst with the sulfur present in the exhaust gas, and also to thermal aging as a result of high temperatures. Sulfur is adsorbed in the NOx storage catalyst as sulfur oxide SOx. Sulfur contamination or SOx contamination of the NOx storage catalyst can thus be mentioned synonymously in the context under discussion here. Contamination with sulfur is typically removed from the NOx storage catalyst by alternating operation with a rich and lean air/fuel ratio λ at high exhaust gas temperatures. This is also referred to as a deSOx operation. However, the high exhaust gas temperatures during such a deSOx operation lead to thermal aging of the NOx storage catalyst. This thermal aging is irreversible. The aging of the NOx storage catalyst is thus composed of irreversible thermal aging and apparent aging resulting from sulfur contamination.

A further drawback of deSOx operations is that operation with high exhaust gas temperatures and a rich air/fuel ratio increases the fuel consumption of the motor vehicle. It is therefore advisable to minimize the number of deSOx operations, both in order to minimize fuel consumption and increase the lifetime of the NOx storage catalyst. For this purpose, it is desirable to know the contamination of the NOx storage catalyst with sulfur with maximum accuracy.

Aging of NOx storage catalysts is manifested in various effects. Firstly, the absolute NOx storage capacity of a NOx storage catalyst is reduced. Secondly, there is an increase in the NOx slip in the course of flow through the NOx storage catalyst. The "NOx slip" is the proportion of NOx present in the exhaust gas which is not adsorbed by the NOx storage catalyst. More particularly, the NOx slip, even though the storage capacity of the NOx storage catalyst is not exhausted, increases with increasing aging. General monitoring of the ability of the NOx storage catalyst to function is increasingly desired, in order to avoid noncompliant pollutant emissions during motor vehicle operation.

One method of diagnosis of NOx storage catalysts is based on the comparison of the air/fuel ratio signals λ in the exhaust gas upstream and downstream of the NOx storage catalyst during the regeneration of the NOx storage catalyst. Such air/fuel ratio signals can be ascertained, for example, by conventional lambda probes.

In order to initiate regeneration of the NOx storage catalyst, the internal combustion engine is switched to the mode of operation with λ<1. A lambda probe arranged upstream of the NOx storage catalyst detects this within the scope of the flow rate of the exhaust gas from internal combustion engine to measurement site and from the intrinsic dynamics with no delay. However, a lambda probe downstream of the NOx storage catalyst does not perceive the "enriching" of the air/fuel ratio λ, on commencement of the regeneration. Only once the NOx and oxygen adsorbed in the NOx storage catalyst is converted for the most part does a lambda probe arranged downstream of the NOx storage catalyst "see" the "enriching".

For example, DE 102012218728A1 utilizes the comparison of the air/fuel ratio signals upstream and downstream of the NOx storage catalyst to assess the aging thereof. DE 102012218728A1 also integrates the two signals and compares the value of the integrals in order to achieve a more meaningful conclusion with low enrichment of the air/fuel mixture.

Further methods of diagnosis of NOx storage catalysts are based on the comparison of NOx contents upstream and downstream of the NOx storage catalyst. Such NOx contents can be ascertained, for example, with NOx sensors. The NOx contents upstream and downstream of the NOx storage catalyst can be used to ascertain NOx slip. With increasing aging of a NOx storage catalyst, there is an increase in the NOx slip.

However, the inventors herein have recognized issues with the above approaches. While the approaches may enable monitoring of the aging of the NOx storage catalyst, the approaches do not address NOx storage catalyst performance degradation resulting from sulfur load. Accurate knowledge of the sulfur loading or sulfur state may aid in reducing desulfurization frequency.

Accordingly, a method of ascertaining a state of aging of a NOx storage catalyst of a motor vehicle with an internal combustion engine is disclosed. In the method, a first proportion of aging of the NOx storage catalyst caused by thermal aging and a second proportion of aging of the NOx storage catalyst caused by sulfur loading are determined and used to ascertain an overall state of aging of the NOx storage catalyst. The second proportion may trigger a desulfurization operation.

There is no known method to date of ascertaining the state of aging of NOx storage catalysts which, like the method of the disclosure, separately ascertains the proportion of the aging resulting from sulfur loading and the proportion of the aging resulting from thermal aging. Through the separate ascertainment of the proportions of aging, it is firstly possible to optimize the frequency of the deSOx operations and secondly to achieve an unambiguous assessment of the irreversible damage to the $NO_X$ storage catalyst. By contrast, this is not possible by the methods described to date.

The method of the disclosure especially allows a restriction in the deSOx operations to the minimum degree necessary for the desulfurization. This advantageously achieves low fuel consumption of the motor vehicle of the disclosure and low thermal aging of the NOx storage catalyst installed in the motor vehicle of the disclosure.

Moreover, the method of the disclosure allows an advantageously exact statement as to the thermal state of aging of the NOx storage catalyst effectively at any time. Existing diagnosis methods enable such statements only after a complete deSOx operation and are less exact, which promotes misdiagnoses.

The method of the disclosure for determining the proportions of the aging of the NOx storage catalyst may be configured such that at least two diagnosis methods are used. In one example, a method of the disclosure is configured such that at least one of the diagnosis methods is sensitive to sulfur loading of the NOx storage catalyst by a first amount and at least one is sensitive to sulfur loading of the NOx storage catalyst by a second, different amount. For example, the first amount may be greater than the second amount, such that one of the diagnosis methods is more sensitive to sulfur loading than another of the diagnosis methods.

The diagnosis method which is less sensitive to sulfur loading may, for example, be a method which compares at least one air/fuel ratio signal upstream with at least one air/fuel ratio signal downstream of the NOx storage catalyst. More particularly, the diagnosis method which is less sensitive to sulfur loading of the NOx storage catalyst may be a method which compares at least one air/fuel ratio signal upstream of the NOx storage catalyst integrated over a period of time with at least one air/fuel ratio signal downstream of the NOx storage catalyst integrated over the same period of time. Such air/fuel ratio signals, also called lambda signals, may be ascertained by conventional lambda probes. However, they may also in some cases be obtained from models or calculated from other signals. For example, the lambda signal upstream of the NOx storage catalyst can be ascertained from an air mass flow and a fuel mass flow into the internal combustion engine.

Such diagnosis methods based on lambda signals ascertain the NOx storage capacity on the basis of the conversion of CO and HC in the NOx storage catalyst during the "rich" regeneration. They have low sensitivity to sulfur loading of the NOx storage catalyst.

In a method of the disclosure, the diagnosis method which is sensitive to sulfur loading of the NOx storage catalyst may be a diagnosis method which ascertains the NOx slip through the NOx storage catalyst from at least one NOx signal upstream of the NOx storage catalyst and at least one NOx signal downstream of the NOx storage catalyst. More particularly, the method which is sensitive to the sulfur loading of the NOx catalyst may be a method which ascertains the NOx slip through the NOx storage catalyst from at least one NOx signal upstream of the NOx storage catalyst integrated over time and at least one NOx signal downstream of the NOx storage catalyst integrated over time. The NOx signals used can be ascertained by conventional NOx sensors. However, they may also in some cases be obtained from models or calculated from other signals. For example, the NOx signal upstream of the NOx storage catalyst can be ascertained from an engine map-based model of the internal combustion engine.

Methods based on the direct ascertainment of the NOx slip have great sensitivity with regard to the sulfur contamination of the NOx storage catalyst. This is because these methods directly determine the amount of NOx adsorbed in the NOx storage catalyst. Potential NOx storage capacity in the NOx storage catalyst blocked by SOx is thus detected as non-existent.

A method of the disclosure may be configured such that it triggers an operation for desulfurization, also called deSOx operation as described above, according to the proportion of the aging of the NOx storage catalyst caused by sulfur loading. For instance, the NOx storage capacity of the NOx storage catalyst is reset to the value still possible at the given thermal aging by desulfurization before occurrence of impermissible NOx emissions. At the same time, however, unnecessary deSOx operations are avoided.

A method of the disclosure may also be configured such that it assesses the NOx storage catalyst as being degraded (e.g., degraded beyond the degree permissible for compliance with the emissions standards) according to the proportion of the aging of the NOx storage catalyst caused by thermal aging. Such an impermissibly damaged NOx storage catalyst generally has to be exchanged. This may be communicated to the driver by a warning message, such that the vehicle may be subjected to a repair before occurrence of impermissible NOx emissions. At the same time, misdiagnoses and unnecessary exchange of the NOx storage catalyst are avoided.

Another part of the disclosure is a monitoring unit for monitoring the state of aging of a NOx storage catalyst of a motor vehicle having an internal combustion engine during the operation of the motor vehicle. The monitoring unit is set up to execute the method of the invention for ascertaining the state of aging of the NOx storage catalyst. For this purpose, the monitoring unit may especially also be configured (e.g., executing instructions) to ascertain signals as to the exhaust gas composition upstream and downstream of the NOx storage catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
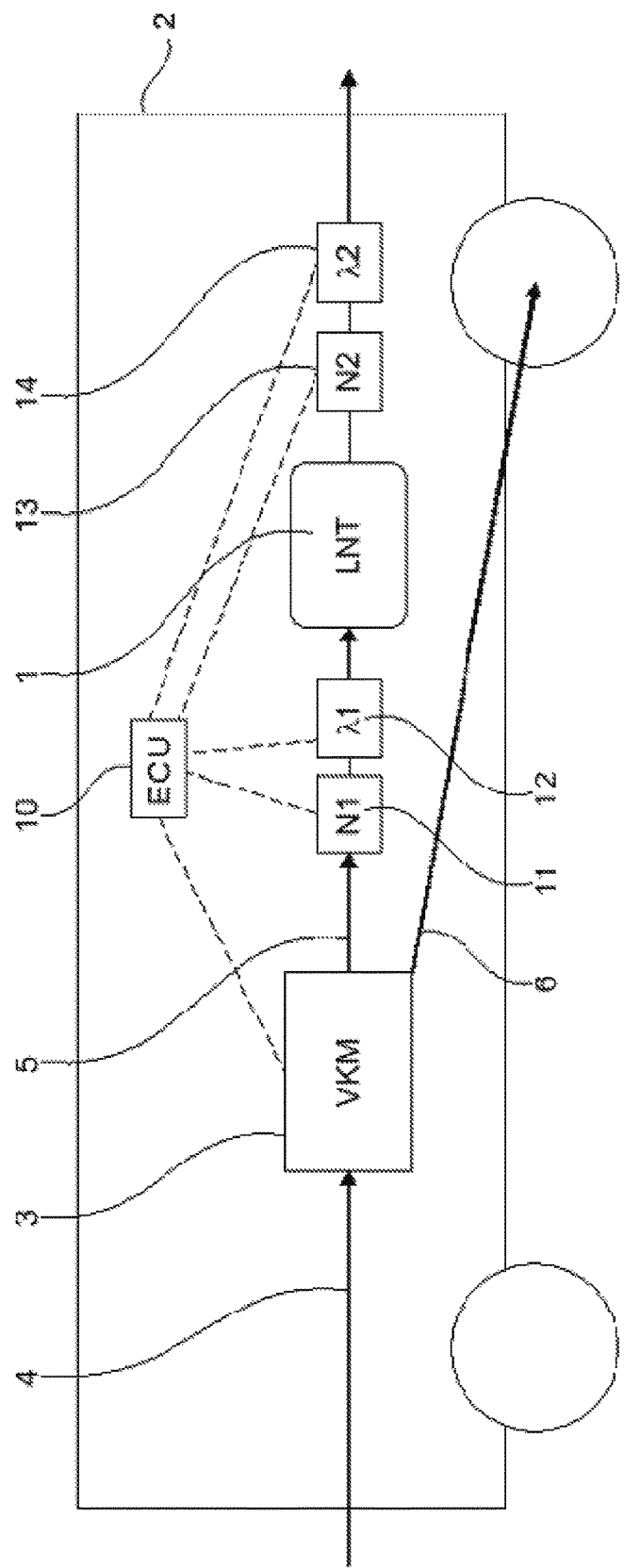
FIG. 1 shows a motor vehicle of the disclosure in schematic form.

FIG. 1 shows, by way of example and shown in highly schematic form, an inventive motor vehicle 2 which may execute a method of the disclosure. Such a motor vehicle 2 comprises at least one NOx storage catalyst 1, an internal combustion engine 3, and a control unit 10.

Fresh air 4 is supplied to the internal combustion engine 3 and combusted with fuel. This generates mechanical energy 6 which is transmitted to the wheels via a drivetrain (not shown). In the combustion engine 3, the combustion gives rise to an exhaust gas 5 which is guided through the NOx storage catalyst 1.

The internal combustion engine 3 may be a standard diesel or gasoline engine. This engine may be designed with various combustion and mixture processing methods and may be operated with various fuels. Internal combustion engine 3 may be operated at least temporarily in lean burn operation (with excess air) and with fuels from hydrocarbon compounds. Such an internal combustion engine 3 emits an exhaust gas 5 containing NOx. When such an internal combustion engine 3 is operated with a fuel containing sulfur, the exhaust gas 5 emitted also contains sulfur or sulfur compounds. Examples of these are standard diesel car and truck engines.

NOx storage catalysts (e.g., NOx storage catalyst 1) are installed in motor vehicles, for example, in conjunction with standard lean burn internal combustion engines (e.g., engine 3). NOx storage catalyst 1 is arranged downstream of the internal combustion engine 3 in the exhaust gas line, and the exhaust gas 5 which is emitted by the internal combustion engine 3 accordingly flows through them. NOx storage catalyst 1 may also be integrated into other components for exhaust gas aftertreatment, for example particulate filters.

The motor vehicle 2 shown here also comprises a NOx sensor 11 upstream of the NOx storage catalyst 1 and a NOx sensor 13 downstream of the NOx storage catalyst 1. Both NOx sensors 11 and 13 are arranged correspondingly in the exhaust gas 5 in order to be able to ascertain a NOx signal in the exhaust gas.

The motor vehicle 2 further comprises a lambda probe 12 upstream of the NOx storage catalyst 1 and a lambda probe 14 downstream of the NOx storage catalyst 1. Both lambda probes 12 and 14 are arranged correspondingly in the exhaust gas 5, in order to be able to ascertain the lambda signal in the exhaust gas.

Alternatively, it is also possible to use the $O_2$ signals of the NOx sensors.

The motor vehicle 2 may be a car or truck. However, a design as a watercraft (boat or ship) or as a motorcycle is also conceivable in principle.

Figure 2:
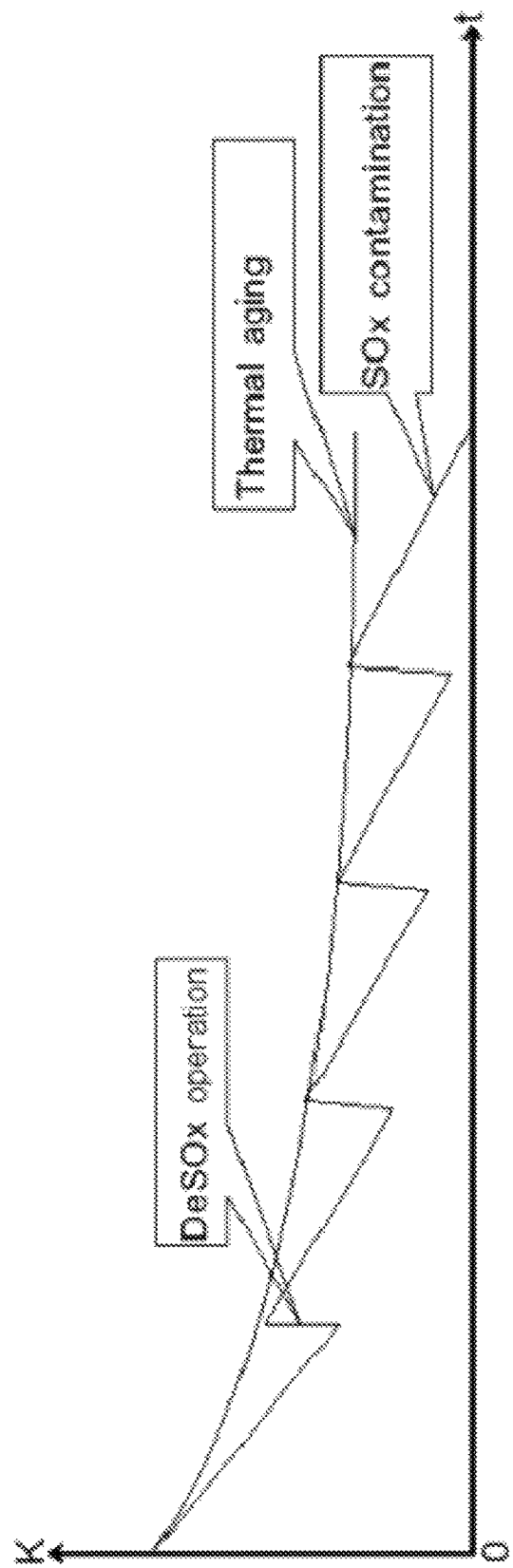
FIG. 2 shows a plot of the NOx storage capacity against time.

FIG. 2 shows, in qualitative form, a NOx storage capacity K of a NOx storage catalyst (such as NOx storage catalyst 1) over time t. The time t describes a period during the operation of the internal combustion engine in which exhaust gas also flows through the NOx storage catalyst. It is apparent that the NOx storage capacity K of the NOx storage catalyst is at first reduced with increasing time t beginning from t=0. This reduction results firstly from thermal aging and secondly from contamination with sulfur. If the contamination with sulfur is eliminated within the scope of a deSOx operation, the NOx storage capacity K of the NOx storage catalyst increases again. However, the NOx storage capacity K of the NOx storage catalyst after a deSOx operation does not attain the starting value of the time t=0 again, as a result of the thermal aging of the NOx storage catalyst.

Figure 4:
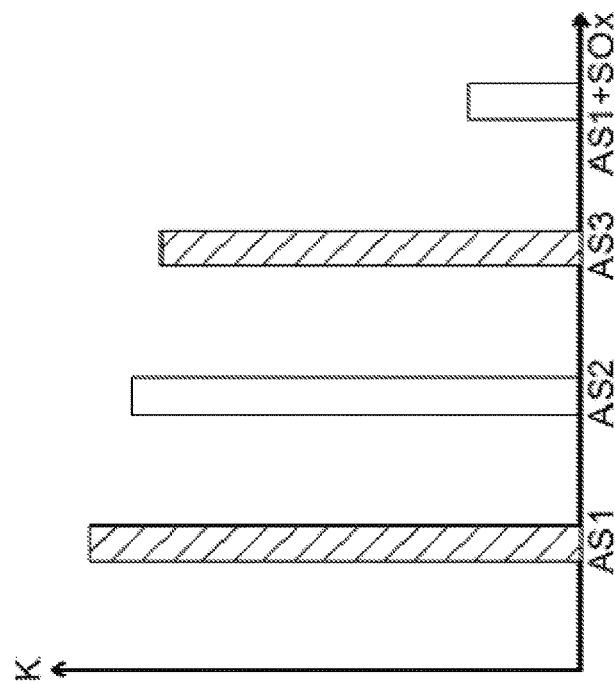
FIG. 4 shows, in schematic form, the NOx storage capacity of differently aged NOx storage catalysts measured by the method with low sulfur sensitivity.
Figure 3:
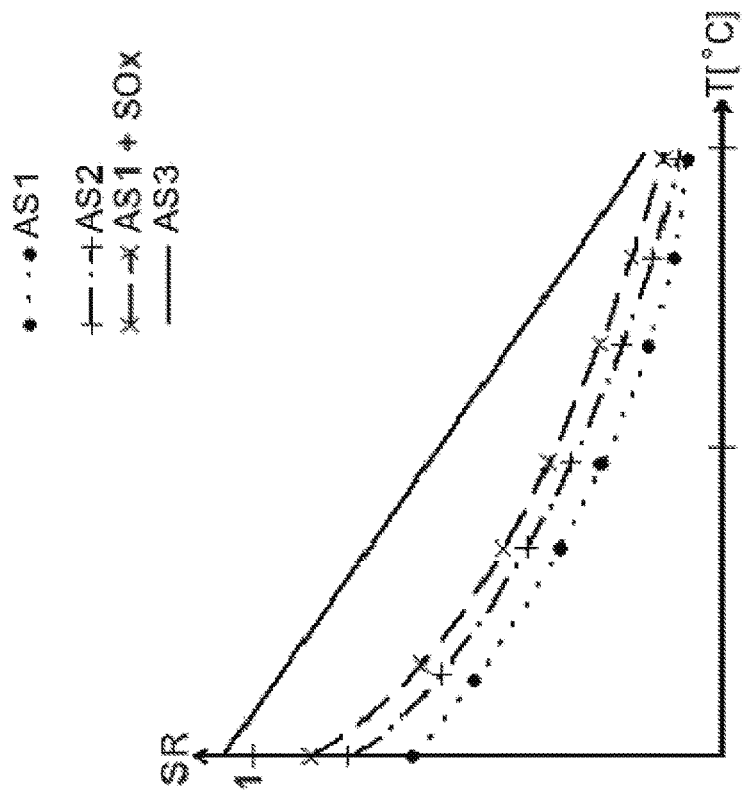
FIG. 3 shows, in schematic form, the combined CO and HC slip rate and NOx storage capacity of differently aged NOx storage catalysts measured by the method with low sulfur sensitivity.

FIG. 3 shows the slip rates SR of differently aged NOx storage catalysts according to a diagnosis method with low sulfur sensitivity, called "method 1" hereinafter. FIG. 4 shows the actual NOx storage capacity K. The graph shown in FIG. 3 shows a slip rate SR ascertained by a method as described in DE 10 2012 218 728 A1. This method assesses integrated lambda signals upstream and downstream of the NOx storage catalyst during rich regeneration operation. The lambda signals can be ascertained, for example, by lambda probes 12 and 14.

The graph in FIG. 4 shows the actual NOx storage capacity K of the same aged NOx storage catalysts. AS1 represents, as aging stage 1, a novel NOx storage catalyst. AS2 and AS3 are thermally aged NOx storage catalysts, AS3 having been thermally aged over a longer period than AS2. It is apparent from FIGS. 3 and 4 that thermal aging both reduces the actual NOx storage capacity and increases the slip rate ascertained by method 1.

On the basis of the definition of method 1, a higher numerical value of the slip rate SR denotes a NOx storage catalyst with lower performance or greater aging. The slip rate SR can thus also be used as an illustrative aging index. The slip rate SR can be normalized, for example, with a slip rate threshold value SR_max which characterizes a NOx storage catalyst impermissibly aged by method 1. It is thus possible to define an aging factor AF1 for method 1.

Thus, in one example, a first aging factor (AF1) may be defined as a measured slip ratio divided by a maximum slip ratio, where the maximum slip ratio represents a fully aged or degraded state of the NOx storage catalyst. The slip ratio may be calculated by determining the difference between an upstream air-fuel ratio, measured upstream of the NOx storage catalyst, and a downstream air-fuel ratio, measured downstream of the NOx storage catalyst, during rich engine operation (e.g., lambda of less than one). As appreciated by FIG. 3, as the NOx storage catalyst ages, more unburnt hydrocarbon, NOx, etc., slips by the catalyst and hence the slip ratio increases as the catalyst ages.

AS1+SOx denotes a novel NOx storage catalyst in terms of thermal aging, which has been contaminated with sulfur. By method 1, AS1+SOx, on the basis of its slip rate SR, is assessed as having lower aging than AS3. However, the NOx storage capacity K of AS1+SOx is much lower than that of AS3. Method 1 is thus a diagnosis method with low sulfur sensitivity.

Figure 5:
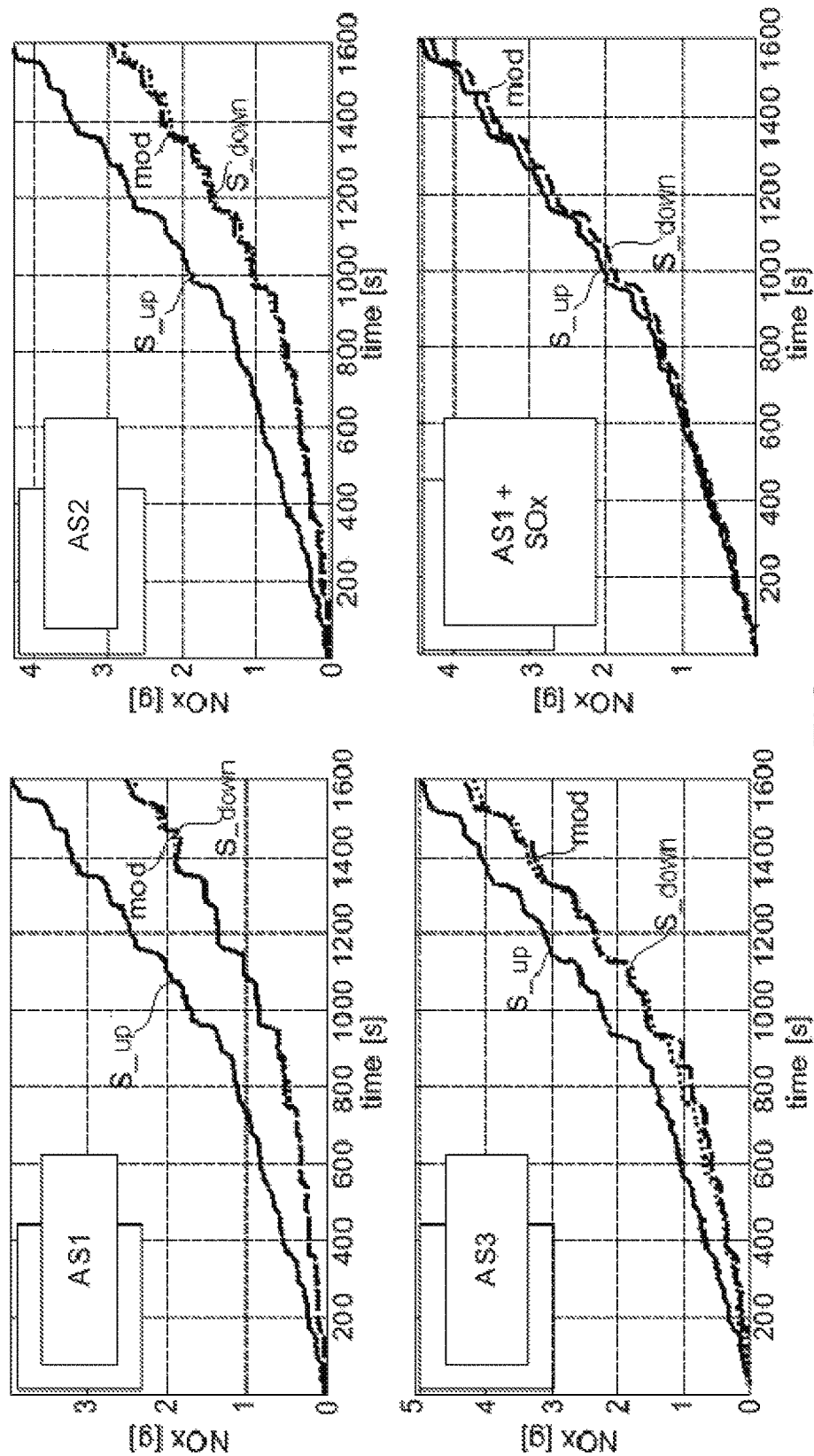
FIG. 5 shows, in schematic form, the NOx slip of differently aged NOx storage catalysts measured by the method with high sulfur sensitivity.

FIG. 5 shows a number of NOx mass flows integrated over time upstream and downstream of NOx storage catalysts in various states of aging. The integrated NOx mass flow rate may be ascertained, for example, from a mass flow rate of the exhaust gas and sensor signals from NOx sensors upstream and downstream of a NOx storage catalyst, such as NOx sensors 11 and 13. The mass flow rate of the exhaust gas may be determined by a control device, such as control device 10, for example, from a mass flow rate of the fresh air and an amount of fuel injected.

The designations of the NOx storage catalysts with regard to their respective states of aging and sulfur contamination are identical to those in FIGS. 3 and 4. In the respective individual graphs of FIG. 5, s_up refers to the integrated NOx mass flow rate upstream of the NOx storage catalyst. The curve s_down correspondingly denotes the integrated NOx mass flow rate downstream of the NOx storage catalyst. The curve mod in each case denotes an integrated NOx mass flow rate downstream of the NOx storage catalyst from a model calculation.

A rise in s_down in relation to s_up means that the proportion of NOx which has been adsorbed by the NOx storage catalyst falls, meaning that the NOx storage catalyst is less active. A method, referred to hereinafter as "method 2", of assessing the state of aging of NOx storage catalysts is based on the comparison of the integrated NOx mass flow rate s_down downstream of the NOx storage catalyst with a threshold value s_down_max. When the threshold value s_down_max is exceeded, the NOx storage catalyst may be classified as being impermissibly aged. By normalization of s_down, for example with the threshold value s_down_max, it is possible to generate an illustrative aging index AF2 for method 2. Thus, in one example, a second aging factor AF2 may be defined as a measured NOx flow rate downstream of a NOx storage catalyst divided by a maximum NOx flow rate that represents a fully aged or degraded state of the NOx storage catalyst. The downstream NOx flow rate may be calculated during lean engine operation (e.g., lambda greater than one). In some examples, the maximum NOx flow rate may be determined based on the upstream NOx flow rate.

It is readily apparent from FIG. 5 that method 2 is sensitive to sulfur contamination of the NOx storage catalyst. The novel NOx storage catalyst in terms of its thermal aging with sulfur contamination AS1-SOx shows an even greater NOx mass flow rate s_down than the highly thermally aged NOx storage catalyst AS3 and is thus assessed as being "more aged".

According to the disclosure, the aging indices of method 1 and method 2 may be evaluated together in order to obtain a conclusion as to the proportion of thermal aging and aging resulting from SOx contamination in the overall current aging of the NOx storage catalyst. The aging of the NOx storage catalyst resulting from SOx contamination may also be referred to as "apparent aging" (AA). This is based on the assumption that aging based on SOx contamination is not "true" aging since it is reversible for the most part through a deSOx operation.

In one example, a number of sensitivity factors are fixed, which reflect the sensitivity of method 1 and method 2 to sulfur contamination. In this example, the sensitivity factor is set at SS1=0.2 for method 1 and the sensitivity factor at SS2=1 for method 2. At least in one example, method 2 represents the highest measurable sensitivity to sulfur, and hence is set to 1, while method 1 represents a fraction of the sensitivity to sulfur as method 2, and thus herein is set as a proportion of 1 (e.g., 0.2). The apparent aging resulting from sulfur contamination AA is then calculated as $$AA=(AF1-AF2)/(SS2-SS1) \quad [\text{eq. 1}].$$

As explained above, AF1 may be determined by the difference between the upstream and downstream air-fuel ratios (AFR) normalized to a maximum downstream AFR. AF2 may be determined based on the difference between the upstream and downstream NOx flow rates normalized to a maximum downstream NOx flow rate. In another example, AF2 may be determined based on the downstream NOx flow rate normalized to a maximum downstream NOx flow rate. Thermal aging A_t is then calculated as $$A\_t=AF1-SS1*AA \quad [\text{eq. 2}]$$

or $$A\_t=AF2-SS2*AA \quad [\text{eq. 3}]$$

It is thus possible to ascertain the state of aging of the NOx storage catalyst 1 in a differentiated manner with regard to thermal aging and NOx contamination and to derive appropriate measures.

For example, by comparison of the apparent aging AA with a threshold value, it is possible to initiate a deSOx operation as indicated. It is also possible via the comparison of thermal aging A_t with a threshold value to ascertain impermissible aging and hence the need for exchange of the NOx storage catalyst.

Figure 6:
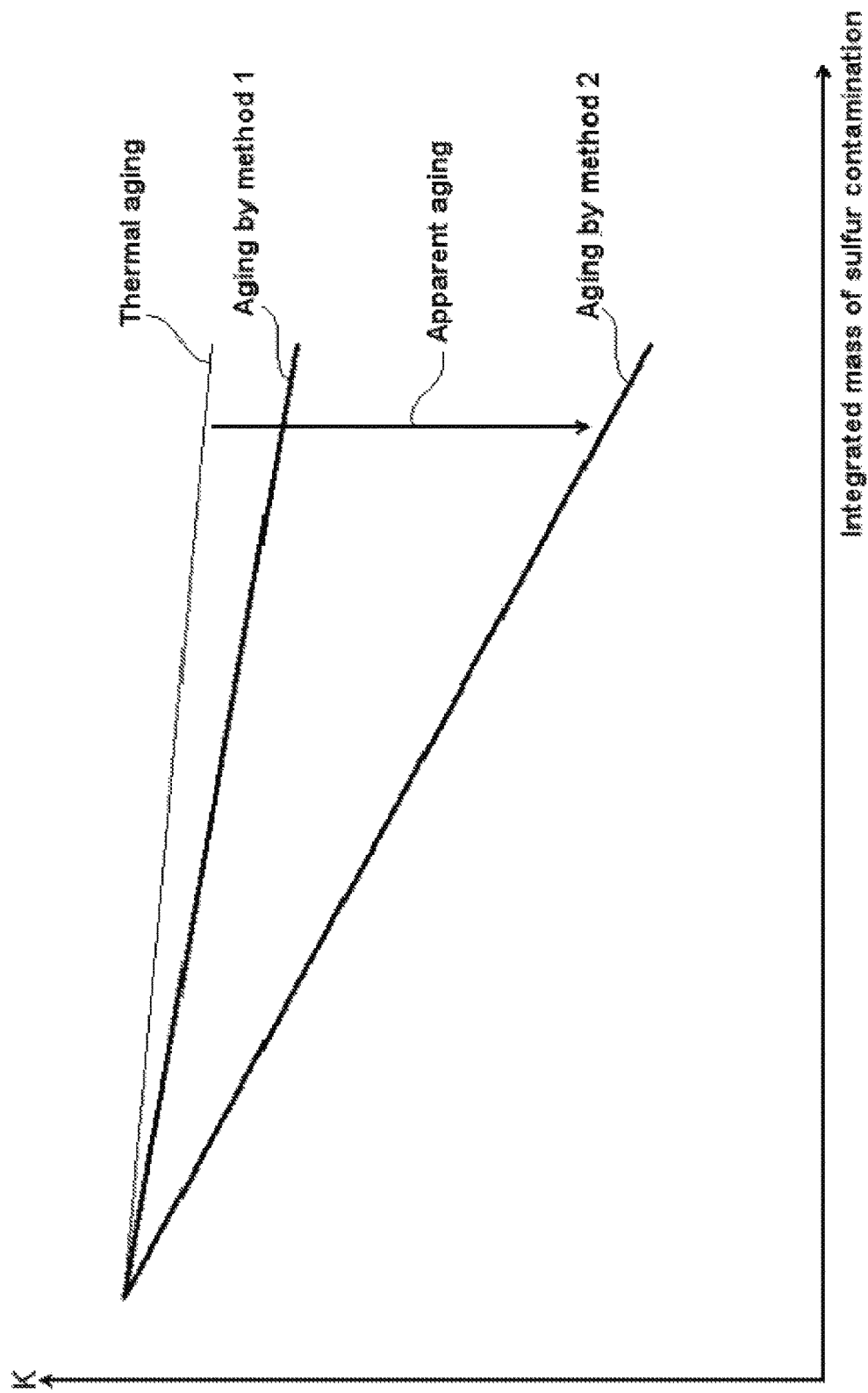
FIG. 6 shows, in schematic form, various aging factors which have been determined by the method of the disclosure.

FIG. 6 gives a qualitative visualization of equations 1 to 3. FIG. 6 shows the plot of the NOx storage capacity K of the NOx storage catalyst against the integrated NOx contamination and operating time. Firstly, the plot of the NOx storage capacity K through aging by methods 1 and 2 is shown. Also shown are the proportions of aging resulting from thermal aging A_t and apparent aging AA ascertained by the method of the disclosure.

Figure 7:
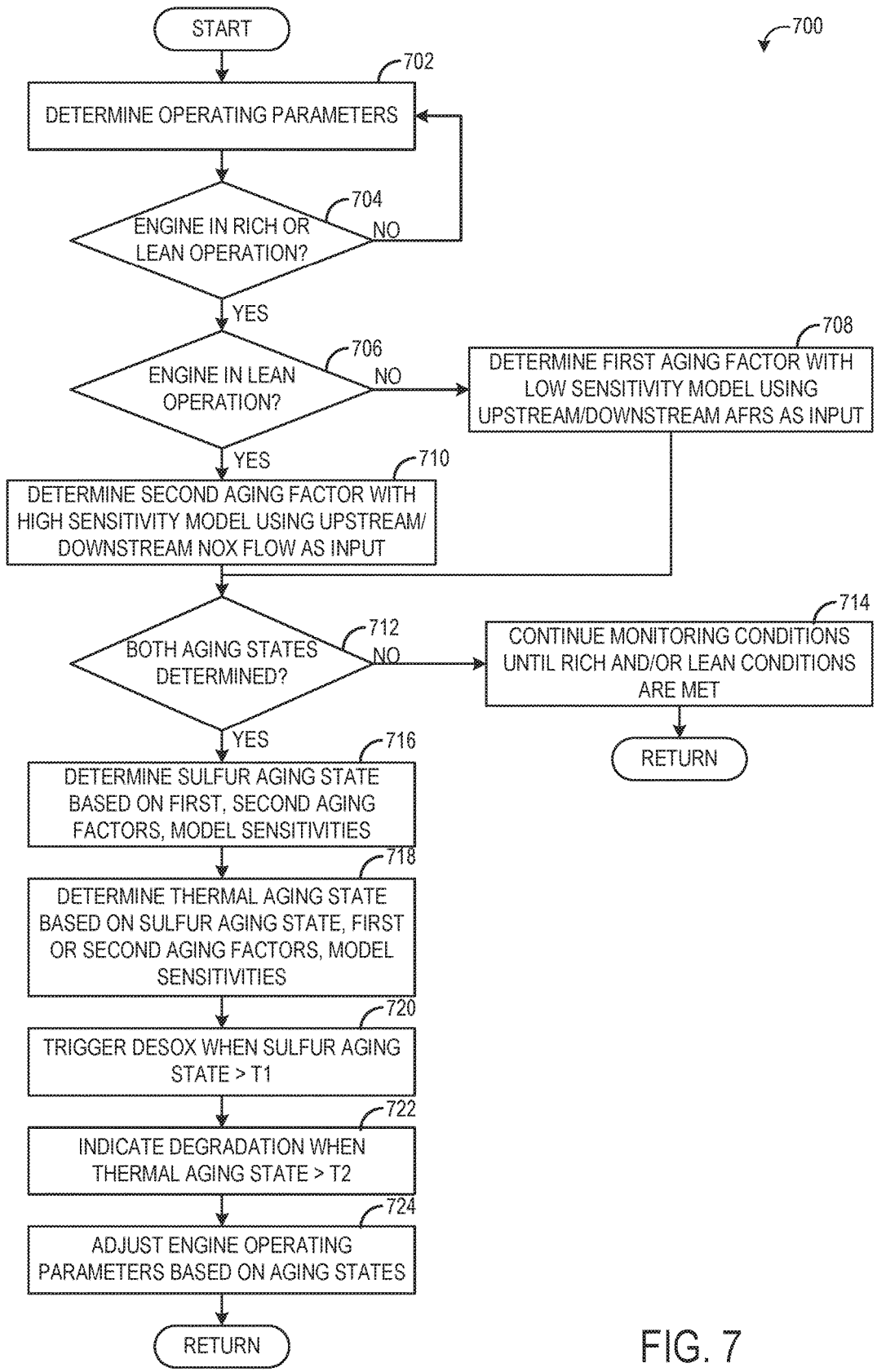
FIG. 7 is a flow chart illustrating a method for determining aging states of a NOx storage catalyst.

FIG. 7 is a flow chart illustrating a method 700 for determining the aging state of a NOx storage catalyst. Method 700 may be carried out by a controller, such as control unit 10, according to non-transitory instructions stored in memory of the controller. The method may be performed in conjunction with one or more sensors (e.g., lambda sensors 12, 14 and NOx sensors 11, 13) and one or more actuators (e.g., fuel injectors of the engine 3).

AT 702, method 700 determines operating parameters. The determined operating parameters may include engine speed, engine load, commanded engine air-fuel ratio, measured exhaust air-fuel ratio, measured exhaust NOx concentration, and other parameters. At 704, method 700 includes determining if the engine is operating under either rich or lean air-fuel ratio conditions. Rich conditions may include a commanded or actual air-fuel ratio that is less than stoichiometry (e.g., more fuel is provided than oxygen is available to combust the fuel). Lean conditions may include a commanded or actual air-fuel ratio that is greater than stoichiometry (e.g., more oxygen is provided than fuel is available to combust with the oxygen).

If the engine is not operating under lean or rich air-fuel ratio conditions (e.g., the engine is operating at stoichiometry), method 700 loops back to 702 to continue monitoring operating parameters. If the engine is operating under rich or lean conditions, method 700 proceeds to 706 to determine if the engine is operating under lean conditions. If the engine is not operating under lean conditions, the engine is thus operating under rich conditions and the method proceeds to 708 to determine a first aging factor of the NOx storage catalyst (e.g., NOx storage catalyst 1) using a low-sensitivity model that utilizes upstream and downstream air-fuel ratios as inputs. The low-sensitivity model exhibits a relatively low sensitivity to sulfur loading on the NOx storage catalyst, and thus may be used to determine the aging state of the NOx storage catalyst resulting from thermal aging.

In one example, the low-sensitivity model may calculate a maximum value of a derivative of a slip ratio and a time elapsed to reach the maximum value (relative to a time when rich exhaust is detected upstream of the NOx storage catalyst). The derivative of the slip ratio may be calculated by determining a mass flow of reductants upstream of the NOx storage catalyst (mfRdcUs) according to the equation mfRdcUs=(1−1/lamUs)*(MAF/PHI), where lamUs is the air-fuel ratio measured upstream of the NOx storage catalyst, MAF is the measured mass air flow, and PHI is stoichiometric air-fuel ratio. A mass flow of reductants downstream of the NOx storage catalyst (mfRdcDs) may be calculated according to the equation mfRdc Ds=(1−1/lamDs)*(MAF/PHI), where lamDs is the air-fuel ratio measured downstream of the NOx storage catalyst. The integral slip ratio is calculated as follows:

mRdcUs=TimeIntegralPurge(mfRdcUs)
mRdcDs=TimeIntegralPurge(mfRdcDs)
rSlp=mRdcDs/mRdcUs The Derivative of the Slip ratio is rDelSlp= TimeDerivativePurge(rSlp)
where by:

mRdcUs: integral mass of reductants in upstream gas over rich purge (g)

mRdcDs: integral mass of reductants in downstream gas over rich purge (g)

rSlp=slip ratio of integral mass of reductants downstream to upstream (−)

rDelSlp: derivative of the slip ratio (1/s)

The aging detection is then determined by comparing the maximum value for the time derivative of the slip ratio (rDelSlp) to a calibrateable threshold (1/s) as well as its time location since richness was achieved in the upstream position to another time threshold (s), as well as the end value of the slip ratio rSlp to a minimum value. As the NOx storage catalyst ages, the higher the value for the rDelSlp, the faster that value is reached (shorter time since richness achieved), and the higher the end value for the slip ratio with aging. In one example, the first aging factor may be set as the rSlp divided by a maximum slip ratio that would be expected for a fully aged NOx storage catalyst.

Returning to 706, if it is determined that the engine is operating under lean air-fuel ratio conditions, method 700 proceeds to 710 to determine a second aging factor using a high-sensitivity model that utilizes upstream and downstream NOx flow as inputs. The high-sensitivity model exhibits a relatively high sensitivity to sulfur loading on the NOx storage catalyst, and thus may be used to determine the aging state of the NOx storage catalyst resulting from sulfur loading.

In one example, the high-sensitivity model may calculate an integrated NOx mass flow rate s_down downstream of the NOx storage catalyst and compare that with a threshold value s_down_max. When the threshold value s_down_max is exceeded, the NOx storage catalyst may be classified as being fully aged. By normalization of s_down, for example with the threshold value s_down_max, it is possible to generate an illustrative aging index AF2. In an example, the second aging factor may be calculated in the same manner as the first aging factor, utilizing output from the downstream and upstream NOx sensors rather than output from downstream and upstream lambda sensors.

Both 708 and 710 proceed to 712, where it is determined if both the first and second aging factors have been determined. If both the first and second aging factors have not been determined, method 700 proceeds to 714 to continue monitoring conditions until rich or lean conditions are met to carry out the respective aging factor determination.

Once both aging factors have been determined, method 700 proceeds to 716 to determine the sulfur aging (SA) state based on the first aging factor, second aging factor, and respective model sensitivities. As explained above, the sulfur aging state may be determined by the difference between the first aging factor and second aging factor divided by the difference between the model sensitivity of the high-sensitivity model and the model sensitivity of the low-sensitivity model, SA=(AF1−AF2)/(SS2−SS1).

At 718, method 700 includes determining the thermal aging (TA) state based on the sulfur aging state, first or second aging factor, and first or second model sensitivity, TA=AF1−SS1*SA or TA=AF2−SS2*SA. At 720, method 700 includes triggering a deSOx operation when the sulfur aging state is greater than a first threshold. In one example, the first threshold may be 0.5, such that the NOx storage catalyst may be purged of sulfur when the NOx storage catalyst is half full of sulfur. In another example, the first threshold may be larger, e.g., 0.9, such that the purge is performed only when the NOx catalyst is relatively full of sulfur. The deSOx (also referred to as sulfur purge) operation may include adjusting fuel injection amounts, fuel injection timing, throttle position, and/or other suitable engine operating parameter to convert and release the stored SOx.

At 722, method 700 includes indicating degradation of the NOx storage catalyst when the thermal aging state is greater than a second threshold. The second threshold may be a suitable threshold that indicates NOx storage and/or conversion is no longer effective, such as 0.7, 0.9, etc. To indicate degradation, an operator may be notified (e.g., via a display element) and/or a diagnostic code may be set.

At 724, method 700 optionally includes adjusting one or more engine operating parameters based on the sulfur and/or thermal aging states. For example, as the NOx storage catalyst ages, fuel injection amounts, fuel injection timing, and/or throttle position may be adjusted to compensate for the aged NOx storage catalyst during storage operation and/or during NOx and/or SOx purge. Method 700 then returns.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of ascertaining a state of aging of a NOx storage catalyst of a motor vehicle having an internal combustion engine, comprising:
   ascertaining a first proportion of aging of the NOx storage catalyst caused by thermal aging via a first method, where the first method includes a first sensitivity factor;
   ascertaining a second proportion of aging of the NOx storage catalyst caused by sulfur loading via a second method, where the second method includes a second sensitivity factor, and where the first sensitivity factor and the second sensitivity factor are fixed factors for sulfur sensitivity of the first method and the second method, respectively;
   ascertaining an overall state of aging of the NOx storage catalyst from both the first proportion and the second proportion; and
   triggering an operation for desulfurization of the NOx storage catalyst based on the first proportion, the second proportion, the first sensitivity factor, and the second sensitivity factor.

2. The method as claimed in claim 1, wherein the first method is less sensitive to sulfur than the second method.

3. The method as claimed in claim 2, wherein the second method is a method which compares at least one air/fuel ratio signal upstream with at least one air/fuel ratio signal downstream of the NOx storage catalyst.

4. The method as claimed in claim 3, wherein the second method is a method which compares at least one air/fuel ratio signal upstream of the NOx storage catalyst integrated over a period of time with at least one air/fuel ratio signal downstream of the NOx storage catalyst integrated over the same period of time.

5. The method as claimed in any of claim 2, in which the first method is a method which ascertains NOx slip through the NOx storage catalyst from at least one NOx signal upstream of the NOx storage catalyst and at least one NOx signal downstream of the NOx storage catalyst.

6. The method as claimed in claim 5, in which the first method is a method which ascertains the NOx slip through the NOx storage catalyst from at least one NOx signal upstream of the NOx storage catalyst integrated over time and at least one NOx signal downstream of the NOx storage catalyst integrated over time.

7. The method as claimed in claim 1, further comprising indicating the NOx storage catalyst is degraded based on the first proportion.

8. A motor vehicle, comprising:
   an internal combustion engine,
   a NOx storage catalyst, and
   a control unit having instructions to:
      ascertain a first proportion of aging of the NOx storage catalyst caused by thermal aging via a first method, where the first method includes a first sensitivity factor;
      ascertain a second proportion of aging of the NOx storage catalyst caused by sulfur loading via a second method, where the second method includes a second sensitivity factor, and where the first sensitivity factor and the second sensitivity factor are fixed factors for sulfur sensitivity of the first method and the second method, respectively;
      indicate the NOx storage catalyst is degraded based on the first proportion; and
      trigger an operation for desulfurization of the NOx storage catalyst based on the first proportion, the second proportion, the first sensitivity factor, and the second sensitivity factor.

9. The motor vehicle of claim 8, wherein to ascertain the first proportion, the control unit has instructions to compare, during rich air-fuel ratio conditions, a first air/fuel ratio signal upstream of the NOx storage catalyst integrated over a period of time with a second air/fuel ratio signal downstream of the NOx storage catalyst integrated over the same period of time.

10. The motor vehicle of claim 8, wherein to ascertain the second proportion, the control unit has instructions to compare a first NOx signal upstream of the NOx storage catalyst with a second NOx signal downstream of the NOx storage catalyst during lean air-fuel ratio conditions.

11. The motor vehicle of claim 8, wherein the control unit has instructions to indicate the NOx storage catalyst is degraded when the first proportion is greater than a first threshold and the control unit has instructions to trigger the operation for desulfurization of the NOx storage catalyst when the second proportion is greater than a second threshold.

12. A method, comprising:
   determining a first aging factor of a NOx storage catalyst based on a first model that includes as inputs an upstream air-fuel ratio upstream of the NOx storage catalyst integrated over a period of time and a downstream air-fuel ratio downstream of the NOx storage catalyst integrated over the same period of time;
   determining a second aging factor of the NOx storage catalyst based on a second model that includes as inputs an upstream NOx flow amount upstream of the NOx storage catalyst and a downstream NOx flow amount downstream of the NOx storage catalyst;
   calculating a sulfur aging state of the NOx storage catalyst based on the first aging factor, the second aging factor, a first sulfur sensitivity factor of the first model, and a second sulfur sensitivity factor of the second model, wherein the first sulfur sensitivity factor is a fixed factor of the first model, and wherein the second sulfur sensitivity factor is a fixed factor of the second model; and increasing engine air-fuel ratio in order to carry out a desulfurization responsive to the sulfur aging state exceeding a threshold sulfur aging state.

13. The method of claim 12, further comprising calculating a thermal aging state of the NOx storage catalyst based on the sulfur aging state, the first aging factor, and the first sulfur sensitivity factor.

14. The method of claim 12, further comprising calculating a thermal aging state of the NOx storage catalyst based on the sulfur aging state, the second aging factor, and the second sulfur sensitivity factor.

15. The method of claim 12, wherein the first sulfur sensitivity factor is lower than the second sulfur sensitivity factor.

16. The method of claim 12, wherein the upstream air-fuel ratio upstream of the NOx storage catalyst and the downstream air-fuel ratio downstream of the NOx storage catalyst are measured during rich air-fuel ratio conditions.

17. The method of claim 12, wherein the upstream NOx flow amount upstream of the NOx storage catalyst and the downstream NOx flow amount downstream of the NOx storage catalyst are measured during lean air-fuel ratio conditions.

18. The method of claim 12, wherein determining the second aging factor of the NOx storage catalyst comprises determining the second aging factor of the NOx storage catalyst based on the second model that includes as inputs an upstream NOx flow amount upstream of the NOx storage catalyst integrated over a period of time and a downstream NOx flow amount downstream of the NOx storage catalyst integrated over the same period of time.

* * * * *